Jan. 10, 1967 H. D. POLSTER 3,296,921
ALIGNMENT AUTOCOLLIMATOR
Filed Oct. 30, 1961
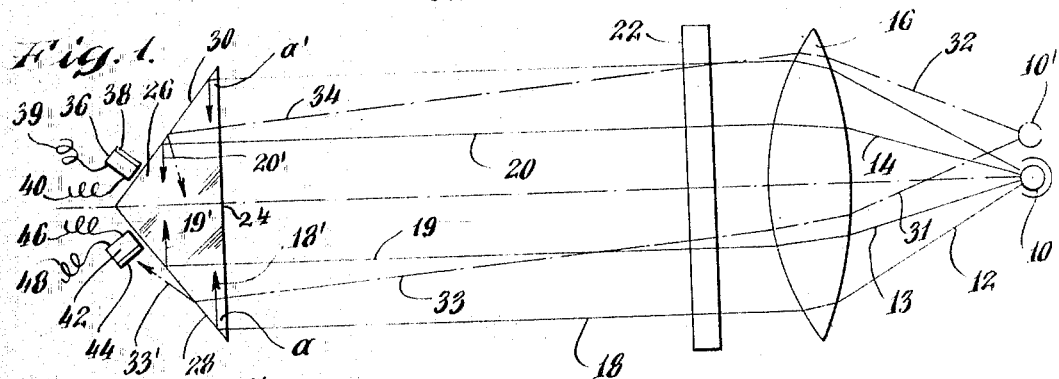
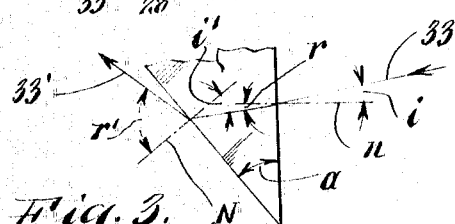
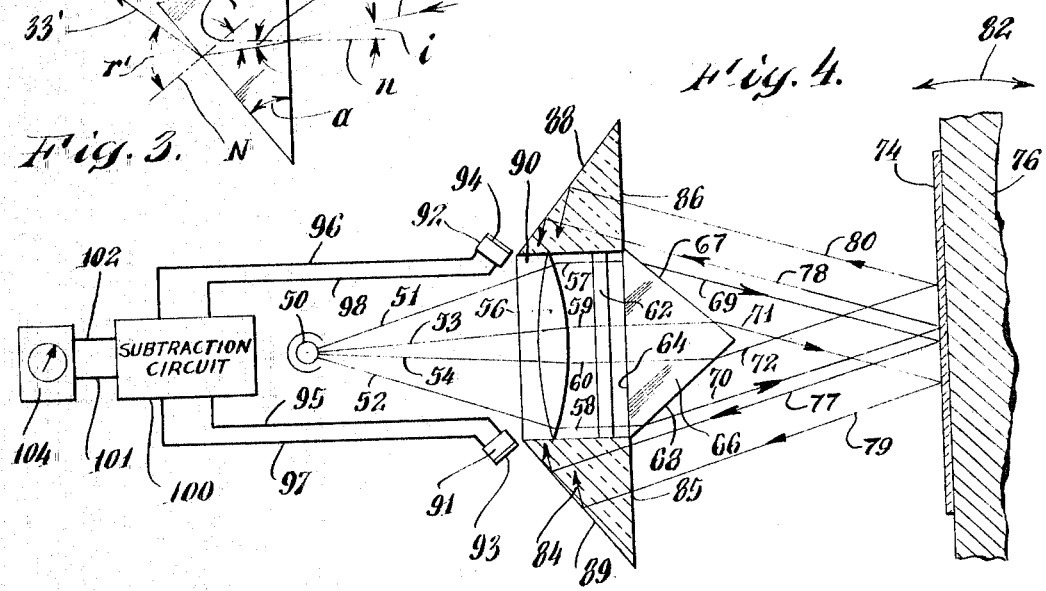
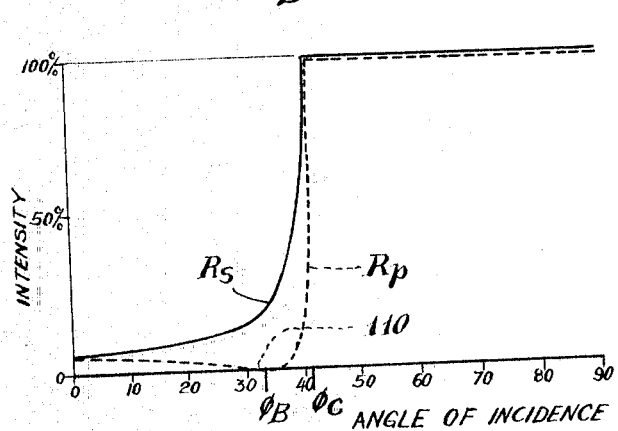
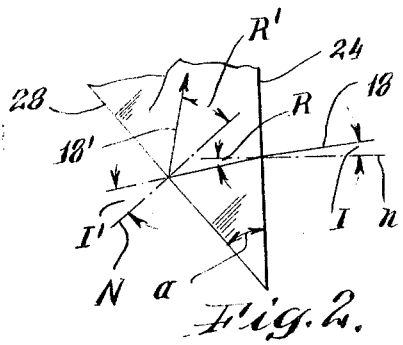
INVENTOR.
HARRY D. POLSTER

United States Patent Office 3,296,921
Patented Jan. 10, 1967

3,296,921
ALIGNMENT AUTOCOLLIMATOR
Harry D. Polster, Stamford, Conn., assignor to The Perkin-Elmer Corporation, Norwalk, Conn., a corporation of New York
Filed Oct. 30, 1961, Ser. No. 148,561
10 Claims. (Cl. 88—14)

This invention relates to an alignment autocollimator of the type useful for determining the rotation of an object about a single axis. More specifically, the invention utilizes the phenomenon of total internal reflection at an interface between an optically more dense and an optically less dense material to determine the angular position of a reflecting surface which may be carried by the object being monitored.

The invention utilizes the fact that a ray or beam of light incident on a more dense to less dense interface will be totally reflected when the angle of incidence is equal to or greater than the critical angle, but will partially pass through the interface when the angle of incidence is less than the critical angle. Since the amount of light transmitted through the interface varies quite rapidly for small changes in the angle of incidence for those angles slightly less than the critical angle, very small angular movements of an external object may be detected by measuring the transmission at such angles. By providing an apparatus in which two parts of a beam of light are made to be incident on two such surfaces substantially at the critical angle and in such a manner that angular deviation of said beam caused by angular movement of the object will change the angle of incidence of the two parts of the beam in the opposite sense or direction, an extremely sensitive angular position monitoring device of the direction-sensitive, null type may be constructed.

An object of the invention is, therefore, the provision of a highly sensitive angular alignment instrument.

Another object in the invention is the provision of an angular measuring system of the null type, which yields measurements of the relative direction of the angular change.

Other objects and advantages of the invention will become obvious to one skilled in the art upon reading the following specification and studying the accompanying drawing in which:

FIG. 1 is a schematic optical diagram of a simple form of an angle measuring device employing total internal reflection, useful in understanding the preferred embodiment;

FIG. 2 is a schematic enlaged detail showing total internal reflection when the beam of rays is incident at an angle at least as large as the critical angle;

FIG. 3 is a schematic enlarged detail of the beam of rays incident at slightly less than the critical angle;

FIG. 4 is a partial schematic, partial cross-sectional view of the preferred embodiment of the invention; and FIG. 5 is a graphical representation of the amount of light reflected as the angle of incidence approaches the critical angle for two differently plane polarized beams of light.

In FIG. 1, a point source of light 10 is shown as producing rays 12, 13, 14, etc., which are collimated by lens 16 so as to produce parallel rays 18, 19, 20, etc.

These rays are then polarized by polarizing filter 22, the purpose for which will be subsequently explained. The collimated rays will enter the front face 24 of prism 26 which may be, for example, a right angle prism. The angle ($a$) which the two back surfaces 28 and 30 make with the front surface 24 is so chosen that the rays 18 and 20 which enter perpendicular to this front face 24 will strike the back surfaces at an angle substantially equal to the critical angle. As shown more clearly in FIG. 2, incoming ray 18 will pass through the front face 24 and strike the back face at an angle ($I'$) to the normal ($N$). If this angle $I'$ is larger than the critical angle, the ray will be totally reflected as shown by the arrowed ray 18'. Similarly the other rays, which are all parallel to rays 18, will be totally reflected as shown by the arrows 19' and 20' in FIG. 1. It should be noted that the detail view of FIG. 2 shows incoming ray 18 making a non-zero angle of incidence ($I$) with the normal ($n$) to the front surface 24 of the prism, while FIG. 1 shows ray 18 as being perpendicular to this front face 24 so as to be at an angle of incidence of zero. The reason for the showing in FIG. 2 is to illustrate the general condition (rather than the specific one of FIG. 1) necessary in order to obtain total internal reflection of a ray such as 18. Thus, a non-zero angle of incidence ($I$) on surface 24 will yield a somewhat smaller, but still non-zero angle of refraction ($R$), of the ray inside the prism, both angles being of course measured from the same normal ($n$) to the front face 24. The angle ($a$) that the rear prism face 28 makes with the front face should be so chosen that the ray makes an angle of incidence ($I'$) with the normal ($N$) to the rear face 28 which is substantially equal to the critical angle for the interface at 28. Thus, in general the refraction at the front face 24, since it changes the direction of the ray, should be considered in determining the angle ($a$) desired for causing total internal reflection at the face 28. In the particular case shown in FIG. 1, where the rays are perpendicular to the front face 24 (i.e., angle of incidence equals zero), there is no change of direction of ray 18 upon entering the prism at face 24; but, in all other cases (including the preferred embodiment of FIG. 4), the angle change at face 24 would be considered in determining the angle ($a$) so as to make the angle of incidence on face 28 substantially equal to the critical angle.

If the point light source 10 should move to the dotted position 10' in FIG. 1, the light rays such as 31 and 32 will still be collimated by lens 16 so as to produce parallel rays 33 and 34, but these rays will not intersect the front prism face 24 at the same angle as would rays 18, 19, and 20. For example, in FIG. 3, ray 33 is shown as being incident on the front surface 24 so as to make an angle ($i$)—greater than ($I$)—with the normal ($n$) thereto. Upon refraction, the ray will leave this interface so as to make an angle ($r$)—greater than ($R$)— with this same normal. The ray will proceed to the back prism surface 28 so as to make an angle ($i$)— smaller than ($I'$)—with the normal ($N$) therewith. Since this angle ($i'$) is less than the critical angle, at least part of the light will emerge from surface 28 as transmitted ray 33' at an angle ($r'$) to the normal ($N$). Since the upper rear surface 30 of the prism makes the same angle ($a'$) with the front face 24 thereof, rays (such as 18, 19, 20) which enter the front face 24 perpendicularly will obviously make the same angle with this rear surface 30 as they do with rear surface 28. However, since this angle ($a'$) between rear face 30 and front face 24 is in the opposite sense (i.e., clockwise from front face 24) to that angle ($a$) made between the rear face 28 and the front face 24 (i.e., counterclockwise from front face 24), any beam of parallel rays, not perpendicular to the front face 24, will make different angles with the two rear faces 28, 30 of the prism.

Referring back to FIG. 1, it will therefore be seen that when the light source is in the position shown in solid lines (i.e., at 10) all of the light reaching prism 26 will be internally reflected by the back surface 28 and 30 thereof. When, however, the light source is at position 10', the rays of light at the lower half of the beam, which therefore eventually strike the lower back surface 28 of the prism, will be partially transmitted by this surface as shown, for example, at 33'. On the other hand, rays such as 34, which are in the upper part of the beam will strike the upper back surface 30 of the prism at an angle which is greater than the critical angle (i.e., farther from the normal). Therefore, the rays in the upper half of the beam will be totally reflected. For this reason, a detector 36, having a light sensitive surface at 38 and output leads 39 and 40, will receive no light in either position of the light source shown in FIG. 1. On the other hand, lower detector 42 having a light sensitive surface at 44, will receive rays such as 33' when the light source is in the dotted (10') position, so as to generate an output at its output leads 46 and 48. Therefore, neither detector will produce a signal when the light source is at the centered position 10 while the lower detector 42 will produce a signal when the light source moves upwardly into such positions as 10'. Conversely, the upper detector 36 will produce a signal when the light source moves below the central position shown at 10. Monitoring of the outputs of both detectors will therefore give an indication when the light source is at any position other than the central position by one or the other of the detectors generating a signal. By simply connecting the two outputs of the detectors in a subtracting manner, the polarity of the signal produced will indicate which direction from the center position the light source has moved.

The above description of the FIG. 1 explanatory device has assumed that the two rear faces 28 and 30 are so angled as to make the rays from light source 10 be incident thereon at substantially the critical angle for the axial (solid line) position of the light source. If the rear faces, however, are both at the same angle to the rays from the axially positioned light source and the two detectors 36 and 42 are substantially identical and connected in a signal-subtracting manner, then the two rear faces may actually make an angle slightly less than the critical angle with such axial rays. This is true because, under the assumed conditions, the signal produced by one detector because of those rays transmitted by one of the rear faces will be exactly equal to the signal produced by the other detector because of the transmitted rays through the other rear face. The reason for preferring this latter relationship is to avoid any "no signal" position in the device when it is manufactured according to reasonable tolerances. Although ideally the rear faces should make an angle exactly equal to the critical angle with the rays parallel to the axis, any error making both of these faces have an angle somewhat greater than this (i.e., angles and $a$ and $a'$ also greater) would cause no transmission to either detector even though the source 10 were slightly off from the central axis. Thus, although ideally the rear surfaces should make an angle exactly equal to the critical angle to rays parallel to the axis, practically speaking these faces should be made to make a slightly lesser angle than the critical angle (i.e., angles $a$ and $a'$ slightly less than theoretically ideal) in order to avoid any "no signal" position. Thus, the term "substantially equal to the critical angle" as used before and hereinafter (including the claims) should be interpreted as meaning "equal to or slightly less than the critical angle". It is, of course, assumed that the rear faces in both FIG. 1 and FIG. 4 make equal angles to the axis and that the detectors utilized are closely matched.

In FIG. 4 the preferred embodiment, which is useful for determining the angular rotation of an external object, is shown. This device comprises a point light source 50 which emits rays such as shown at 51, 53 and 52, 54, which are collimated by lens 56 so as to emerge therefrom as rays 57, 59, and 58, 60. These rays will then traverse polarizing filter 62 in much the same manner as in the FIG. 1 device. A bi-prism 66, however, is transposed in the parallel beam immediately after polarizing filter 62. The effect of this bi-prism is to refract at its second surfaces 67, 63 the rays entering the prism at its first surface 64. More particularly, the rays, such as 57 and 59, which encounter the upper second surface 67 will be deviated downwardly as shown by rays 69 and 71, while the rays, such as 58 and 60, which intercept the lower second surface 68 will be refracted upwardly as shown by rays 70 and 72. Since the second surfaces 67 and 68 are arranged at equal angles to the horizontal (which represents the optical axis of the system), rays 69 and 71 on the one hand and ray 70 and 72 on the other hand will both make the same angle to the horizon but in opposite directions. All of the rays will be reflected by reflecting surface 74 which is mounted on the object 76 being monitored. The lower beam of rays, represented by parallel rays 70 and 72 will be reflected from surface 74 so as to form a parallel beam represented by rays 78 and 80, and the parallel beam represented by rays 69 and 71 will be reflected as parallel rays 77 and 79. For the position of the object and reflecting surface shown in this figure, namely, with the reflecting surface vertical, these two reflected beams will make the same angle (but in the opposite direction or sense) with the horizontal. On the other hand, any rotary movement of the object and its associated reflecting surface, as indicated by the double curved arrow 82, will change the direction of these reflected beams so as to make one more nearly parallel to the horizontal and the other form a greater angle with the horizon than shown in FIG. 4. Assuming a vertical position of reflecting surface 74, rays such as 78 and 80 will then enter prism 84 through its upper front surface 86 and be reflected by the upper rear surface 88 in a manner similar to that previously described in FIG. 1. Similarly, rays 77 and 79 will enter the prism at its lower front surface 85 and be reflected by lower rear surface 89.

Prism 84 is composed of a single piece of transmitting material which is apertured at 90 so as to receive lens 56, polarizing filter 62, and prism 66. The two front surfaces 85 and 86 are preferably ground as a single surface at the same time so as to be formed in the same plane with each other. Rear surface 88 and 89 are formed so as to be at the same angle with the plane defined by the front surfaces 85 and 86, but of course, are angled therefrom in the opposite sense. The angle between the front and rear surfaces is so chosen that the rays 77 through 80 will strike these rear surfaces at an angle which is substantially equal to (i.e., equal to or slightly less than) the critical angle. The prism thus has a plane of symmetry, namely, the horizontal plane perpendicular to the paper in FIG. 3, which plane contains the optical axis of the device.

Detectors 91 and 92, having radiant energy sensitive surfaces 93 and 94 respectively, are so positioned behind the rear faces of the prism 84 that any light which is transmitted by said rear surface will impinge upon these energy sensitive surfaces. The output of detector 92 is fed by wires 96 and 98 to subtraction circuit 100, and output leads 95 and 97 similarly connect detector It will thus be seen that the invention provides a highly sentitive angular alignment device utilizing the phenomenon of total internal reflection. As pointed out earlier, the use of a single prism of high refractive index material of polarized light, and of a unitary mounting of most of the elements yields a highly sensitive instrument, which should not require any adjustments during use. Additionally, the lack of moving parts obviates the possibility of any wear during use. The only time-variable parameter which exists is the loss of sensitivity with age of the detectors: for this reason, the detectors should be as closely matched as possible so that any variation with age (or temperature) should be substantially the same for both. It is possible to utilize a single detector and differentially chopped light to eliminate the problem of detector matching, but such additional elements would cause the loss of the advantages of lack of mechanical movement and simplicity of parts. In such a single detector system, the light which may be transmitted by each of the rear faces 88 and 89 would be chopped in a different manner (such as at the same frequency but having different phases or, alternatively, at different frequencies) and then be directed as by mirrors behind these rear faces) to the same detector. The parts of the signal of the the detector output caused by each of the separate beams transmitted by face 88 and 89 would then be separated (as by phase sensitive resolver or, alternatively by an electrical frequency (cross-over) network) and then compared as by a subtraction circuit. Even where a pair of detectors are utilized, a single chopper or the modulation of the light source would provide the advantage of A.C. rather than D.C. detector signals. This addition may be advisable where the final output (i.e., at leads 100 and 101) is utilized for controlling another device, but is deemed an unnecessary complication where this output is used merely to drive an indicator, as in FIG. 4 device.

As previously stated, the term "substantially equal to the critical angle" is intended to include angles slightly less than or equal to the critical angle but to exclude angles greater than the critical angle, as this term is used in the preceding specification and in the following claims.

Since various modifications may appear to one skilled in the art upon reading of this specification in conjunction with the accompanying drawing, the invention is not limited to the specific details shown and described; on the contrary, the invention includes and is intended to include any device falling within the scope of the appended claims.

I claim:
1. A device for monitoring the angular position of an object comprising: means for creating a radiant energy beam; polarizing means for substantially plane polarizing said radiant energy beam; radiant energy transparent means of comparatively high refractive index material so positioned as to receive said radiant beam reflected by said object; said transparent means having two rear surfaces, positioned so that part of said reflected radiant beam will strike each of said rear surfaces after transversing said transparent means; said rear surfaces being at such an angle relative to each other that the part of said reflected beam which strikes each of said rear surfaces will be incident thereon at the same angle, substantially equal to the critical angle, for one angular position of said reflected beam; said two surfaces being inclined to said beam at angles differing in sense so that a rotation of said beam from said one position will cause said reflected parts of said beam to be incident on said rear surfaces at mutually different angles; the line of intersection of the planes including said rear surfaces being perpendicular to the plane of vibration of said plane polarized beam so that the individual rays of said beam strike each of said rear surfaces at the same angle of incidence as measured in planes parallel to said plane of vibration; and means for detecting any radiation transmitted by said rear surfaces, thereby determining deviation of said reflected beam and therefore of said object.

2. A device for monitoring the angular position of an object comprising: means for creating a radiant energy beam; means for dividing said radiant beam into two different beam parts; radiant energy transparent means of comparatively high refractive index material so positioned as to receive both of said two different parts of said radiant beam reflected by the object; said transparent means having two rear surfaces, each being so positioned that one of said parts of the reflected beam will impinge thereon after traversing said transparent means; said rear surfaces being at such an angle relative to each other that each of said beam parts will be incident on its respective rear surface at the same angle, substantially equal to the critical angle, for one angular position of said reflected beam; each of said two surfaces being inclined to its respective beam part at an angle which differs in sense so that joint rotation of said reflected beam from said one position will cause said beam parts to be incident on said rear surfaces at mutually different angles; and means for detecting any radiation transmitted by said rear surfaces, thereby determining deviation of said reflected beam and therefore of said object.

3. The device according to claim 2, in which said means for dividing said radiant beam into two different beam parts comprises means for differentially deviating said beam parts by refraction.

4. The device according to claim 3, in which said differentially deviating refraction means comprises two surfaces positioned in front of said radiant energy transparent means, said two surfaces being angled relative to each other.

5. A device for monitoring the angular position of an object with a substantially planar reflective surface comprising: a light source for creating a beam of radiant energy; a lens for collimating said beam of radiant energy; means for dividing said collimated beam into two different beam parts; a prism of refractive transparent material having a front surface and a pair of rear surfaces inclined to said front surface at equal angles, said prism being positioned so as to receive at said front surface both of said two different parts of said collimated beam reflected by said object said rear surfaces being at such an angle relative to each other that the part of said reflected beam which strikes each of said rear surfaces will be incident thereon at the same angle, substantially equal to the critical angle, for one angular position of said object; said two rear surfaces being inclined to said beam at angles differing in sense so that a rotation of said object from said one position will cause said parts of said beam to be incident on said rear surfaces at mutually different angles; and means for detecting any radiation transmitted by said rear surfaces thereby detecting and deviation of said beam and therefore of said object.

6. The device according to claim 5 wherein said means for dividing said radiant beam into two different beam parts comprises a bi-prism for dividing said radiant beam into two non-parallel collimated beams.

7. The device according to claim 6, said prism having an optical axis passing through its axis of symmetry and wherein said light source is optically positioned along said axis of symmetry of said prism.

8. The device according to claim 7, said prism having a recessed portion along its optical axis and wherein said light source is positioned inward from said front surface of said prism.

9. The device according to claim 8 and further including means positioned between said light source and said bi-prism for polarizing said beam of radiant energy.

10. The device according to claim 5 wherein said means for detecting any radiation transmitted by said rear surfaces includes a detector located near each rear surface, 91 to this circuit 100. Subtraction circuit 100 will of course measure the difference between the outputs of the two detectors and supply this difference signal over wires 101 and 102 to an indicator, such as meter 104. When the object and its associated reflecting surface 74 are vertical, each of the detectors will reveice the same amount of light so that the final output as shown by meter 104 will be zero. However, rotation of the object, say, in the counterclockwise direction will decrease the angle of incidence of the beam represented by rays 77 and 79 at rear surface 89 so that more of the light will be transmitted by this surface. On the other hand, rotation of the reflecting surface in this direction will only increase the angle of incidence of rays 78 and 80 on upper rear surface 88, so that less or no light will pass therethrough. Thus, the situation will be similar to that shown in dotted lines in FIG. 1. Detector 91 will therefore generate a signal while detector 92 has a zero output, so that the subtraction circuit will feed a signal to meter 104 which will show by its sign or polarity which of the detectors has the larger output and by its magnitude the difference therebetween, which is a function of angular position of the object. Conversely, should the object and reflecting surface rotate in a clockwise direction, those rays striking upper surface 88 will be incident thereon at less than the angle shown in FIG. 4 so that a greater amount will be partially transmitted to reach detector 92; of course, the rays reaching lower rear surface 89 will form an angle of incidence greater than shown in FIG. 4 and generally greater than the critical angle and will be totally reflected (or substantially so) so that detector 91 will have an extremely small or a zero output. Therefore, meter 104 will show a greater output from detector 92, again indicating the direction and degree of the object rotation.

FIG. 5 is a graph of the intensity of the reflection at an interface between a more to less optical dense material for two beams of light plane polarized in perpendicular planes. This graph is essentially the same as shown in FIG. 18E on page 393 of book, "Fundamentals of Physical Optics" by Jenkins and White (first edition, 1937), McGraw-Hill Book Company, New York. The solid line curve labeled $R_s$ is the intensity of the reflected part of a beam polarized so as to vibrate in the plane perpendicular to the plane of incidence on a more to less dense interface versus the angle of incidence. The dotted line shows the reflected intensity at the same interface of a beam plane polarized in a plane parallel to the plane of incidence versus this angle. The abscissa point $\phi \beta$ is the Brewster angle and the point $\phi_c$ is the critical angle for the particular optical material utilized. As is well known, where the less dense material is air, the Brewster (or polarizing) angle is equal to the arctangent of the reciprocal of the index of the refraction of the more dense material; and the critical angle is the arcsine of this same quantity. In the FIG. 5 graph, the index of refraction of the optically more dense material is 1.54 (as stated in said book, supra), and the less dense material (being air) has an index of refraction equal to 1.00. The graph is intended only to be examplary, since the prism 84 (or 26) is preferably of a much higher refractive index material as explained below.

As shown in FIG. 5 the intensity of the reflected part of the beam which vibrates parallel to the plane of incidence ($R_p$) will decrease between zero degrees and the Brewster angle ($\phi \beta$) so as to equal zero (at point 110) at this latter angle. Since all of the light is reflected at angles of incidence greater than the critical angle ($\phi_c$), the percentage of this beam reflected increases very rapidly between the Brewster and critical angles. Since the beam vibrating in the plane perpendicular to the plane of incidence ($R_s$) shows a more gradual increasing percentage of reflection, its curve does not rise as rapidly at values near the critical angle as does the $R_p$ curve. For this reason, a device of the type shown in either FIG. 1 or 4 will be more sensitive if the light beam utilized is polarized so to be vibrating parallel to the plane of incidence, because the drop in the percentage reflected as the angle of incidence falls slightly below the critical angle is more rapid. Since this rapid drop in reflectivity is, of course, equivalent to a sudden increase from zero in the intensity of the refracted part of the beam, the amount of light so refracted will be greater for an angle slightly less than the critical angle where "$R_p$" type light is used. For this reason, polarizer 22 in FIG. 1 and polarizer 62 in FIG. 4 are so positioned that only light vibrating in the plane of the paper in the drawing ultimately reaches the prism 26 and 84.

Since, as shown by the $R_p$ curve in FIG. 5, this polarized component will drop from 100% to 0% reflection as the angle of incidence decreases from the critical angle to the Brewster angle, it is obvious that the closer together these two angles are, the more rapid will be this decrease in reflectivity. In can be readily shown that the Brewster and critical angles will approach each other as the index of refraction becomes greater and greater. Therefore, in order to maximize the slope of the reflectivity curve, a transparent material having the greatest possible index of refraction should be utilized for prism 84. Where the radiant energy beam utilized is infrared, an incandescent lamp bulb operating at 2600 to 2800° K. peaks in the 1–3 micron region), a material such as germanium, having an index of refraction of 4.068 (for radiation of 2.6 micron wave length), is therefore highly advantageous. For other parts of the radiant energy spectrum use is made of a material having as high an index of refraction as is practical, (i.e., that material which has the highest index and is substantially transparent for that part of the spectrum utilized and is practically suitable from the cost and mechanical property standpoint). For near infrared (i.e., 1–3 microns) lead sulfide detectors, having peak sensitivity in the 2–3 micron region, are suitable.

The use of a single prism (such as 84) for both interfaces (rear faces 88 and 89) assures that the angle between these interfaces remains constant, thereby obviating the possibility of misadjustment. Similarly, the mounting of lens 56 and polarizer 62 rigidly inside this prism and the mounting of the light source and the prism rigidly to each other (not shown) eliminates another possible source or error, thereby simplifying any alignment adjustment which may be required upon installation of the device. Because the refracted portion of the light at the rear prism faces will leave at very large angles of refraction, i.e., nearly parallel to the surface, detectors such as 35, 42, 91, and 92 are so placed that their detecting surfaces are almost perpendicular to the prism surface so as to be also substantially perpendicular to the refracted rays. In order to increase the signal to noise ratio of these detectors, as small a detector surface as is practical should be utilized; and, therefore, the beam of rays may be limited to a very narrow dimension in the plane of the paper in the drawing.

The particular shape of the bi-prism 66 will, of course, vary depending on the distance therefrom of the object-carried mirror 74. Thus, this prism is shown as having its front surfaces 67 and 68 making a rather sharp angle at their vertex; where the object and mirror 74 are at a greater distance however, these front surfaces would be more nearly co-planar. Similarly, the angles which the back surfaces 88 and 89 of prism 84 make with the front face 86 thereof will vary slightly depending on the specific shape of prism 66 and the distance of mirror 74. In any event, the angle of these rear surfaces will be chosen so that the entering parallel rays 77, 79, 78, and 80 will strike them at the same angle, substantially equal to the critical angle (i.e., equal to or slightly less than this angle) for the position of mirror 74 which is perpendicular to the optical axis of the system.

each detector having a light sensitive surface positioned at right angle to each of said rear surfaces of the radiant energy transparent means.

References Cited by the Examiner

UNITED STATES PATENTS

| | | | |
|---|---|---|---|
| 2,425,399 | 8/1947 | Sachtleben | 88—65 X |
| 2,703,505 | 3/1955 | Senn. | |
| 2,829,363 | 4/1958 | Obermaier et al. | 88—14 X |
| 2,870,671 | 1/1959 | Falconi | 88—14 |
| 2,881,654 | 4/1959 | Toffolo | 88—1 |
| 2,882,784 | 4/1959 | Toffolo | 88—1 |
| 2,998,746 | 9/1961 | Gievers | 88—14 |
| 3,024,365 | 3/1962 | Smith et al. | |
| 3,031,919 | 5/1962 | Collyer | 88—14 |
| 3,079,835 | 3/1963 | Saperstein | 88—14 |
| 3,137,794 | 6/1964 | Seward | 88—14 X |

JEWELL H. PEDERSEN, *Primary Examiner.*

E. G. ANDERSON, *Examiner.*

T. L. HUDSON, O. B. CHEW, *Assistant Examiners.*